US010668456B2

(12) United States Patent
Iwanaga et al.

(10) Patent No.: US 10,668,456 B2
(45) Date of Patent: *Jun. 2, 2020

(54) TITANIUM OXIDE PARTICLE, COMPOSITION FOR FORMING PHOTOCATALYST, AND PHOTOCATALYST

(71) Applicant: FUJI XEROX CO., LTD., Tokyo (JP)

(72) Inventors: Takeshi Iwanaga, Kanagawa (JP); Hiroyoshi Okuno, Kanagawa (JP); Hideaki Yoshikawa, Kanagawa (JP); Yasunobu Kashima, Kanagawa (JP); Sakae Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 15/672,497

(22) Filed: Aug. 9, 2017

(65) Prior Publication Data

US 2018/0161763 A1 Jun. 14, 2018

(30) Foreign Application Priority Data

Dec. 12, 2016 (JP) ................. 2016-240463

(51) Int. Cl.
| | | |
|---|---|---|
| B01J 31/12 | (2006.01) | |
| C07F 7/28 | (2006.01) | |
| B01J 35/00 | (2006.01) | |
| B01J 37/02 | (2006.01) | |
| B01J 31/14 | (2006.01) | |
| B01J 21/18 | (2006.01) | |
| B01J 31/02 | (2006.01) | |
| B01J 35/02 | (2006.01) | |
| C07F 7/18 | (2006.01) | |
| B01J 37/03 | (2006.01) | |
| B01J 21/06 | (2006.01) | |
| C09C 1/36 | (2006.01) | |

(52) U.S. Cl.
CPC ............ *B01J 31/12* (2013.01); *B01J 21/063* (2013.01); *B01J 21/18* (2013.01); *B01J 31/02* (2013.01); *B01J 31/122* (2013.01); *B01J 31/14* (2013.01); *B01J 31/143* (2013.01); *B01J 35/004* (2013.01); *B01J 35/0013* (2013.01); *B01J 35/023* (2013.01); *B01J 37/0215* (2013.01); *B01J 37/0221* (2013.01); *B01J 37/031* (2013.01); *B01J 37/033* (2013.01); *B01J 37/035* (2013.01); *C07F 7/1804* (2013.01); *C07F 7/28* (2013.01); *C09C 1/3684* (2013.01); *B01J 31/0274* (2013.01); *C01P 2002/85* (2013.01); *C01P 2004/51* (2013.01)

(58) Field of Classification Search
None
See application file for complete search history.

(56) References Cited

U.S. PATENT DOCUMENTS

| | | | |
|---|---|---|---|
| 5,411,761 A | 5/1995 | Inokuchi et al. | |
| 5,922,500 A | 7/1999 | Lida et al. | |
| 5,965,312 A | 10/1999 | Nakazawa et al. | |
| 6,171,747 B1* | 1/2001 | Sugizaki | G03G 9/0823 430/110.4 |
| 6,235,270 B1 | 5/2001 | Ishii et al. | |
| 7,090,823 B1 | 8/2006 | Liu | |
| 7,211,543 B2* | 5/2007 | Nakabayash | B01J 21/063 502/350 |
| 7,959,980 B2 | 6/2011 | Nakajima et al. | |
| 10,155,220 B2 | 12/2018 | Kashima et al. | |
| 10,183,275 B2 | 1/2019 | Okuno et al. | |
| 2004/0248075 A1 | 12/2004 | Yamaguchi et al. | |
| 2005/0191505 A1* | 9/2005 | Akarsu | B01J 35/004 428/469 |
| 2006/0009351 A1 | 1/2006 | Iwamoto et al. | |
| 2006/0162617 A1 | 7/2006 | Tanaka et al. | |
| 2007/0248831 A1 | 10/2007 | Nishihara et al. | |
| 2007/0269732 A1 | 11/2007 | Matsumura et al. | |
| 2008/0268268 A1 | 10/2008 | Masaki et al. | |
| 2010/0279118 A1 | 11/2010 | Hempenius | |
| 2011/0159109 A1 | 6/2011 | Lee et al. | |
| 2012/0040194 A1* | 2/2012 | Kanai | B01J 35/004 428/447 |
| 2012/0122668 A1 | 5/2012 | Celiker et al. | |

(Continued)

FOREIGN PATENT DOCUMENTS

| | | |
|---|---|---|
| CN | 102317069 A | 1/2012 |
| JP | 05-221640 A | 8/1993 |

(Continued)

OTHER PUBLICATIONS

Office Action dated Apr. 20, 2017 in U.S. Appl. No. 15/208,278.
Office Action dated Apr. 20, 2017 in U.S. Appl. No. 15/212,021.
Office Action dated Apr. 20, 2018 in U.S. Appl. No. 15/491,030.
Office Action dated Apr. 26, 2019 in U.S. Appl. No. 15/903,093.
Office Action dated Apr. 29, 2019 in U.S. Appl. No. 15/208,278.
Office Action dated Apr. 29, 2019 in U.S. Appl. No. 15/212,021.
Office Action dated Aug. 13, 2018 in U.S. Appl. No. 15/212,021.
Office Action dated Aug. 7, 2018 in U.S. Appl. No. 15/208,278.

(Continued)

*Primary Examiner* — Stefanie J Cohen
(74) *Attorney, Agent, or Firm* — Sughrue Mion, PLLC

(57) ABSTRACT

A titanium oxide particle includes a metal having a hydrocarbon group, which is bonded to a surface of the titanium oxide particle through an oxygen atom, and absorbs light having a wavelength of 450 nm and light having a wavelength of 750 nm, wherein an element ratio C/Ti between carbon C and titanium Ti in a surface of the titanium oxide particle is from 0.3 to 1.2, and a reduced amount of C/Ti on the surface of the titanium oxide particle before and after irradiation with an ultraviolet ray having a wavelength of 352 nm and at an irradiation intensity of 1.3 mW/cm$^2$ for 20 hours is from 0.1 to 0.9.

20 Claims, No Drawings

(56) References Cited

U.S. PATENT DOCUMENTS

| | | | |
|---|---|---|---|
| 2013/0164444 A1* | 6/2013 | Tokumitsu | C01G 23/053 427/219 |
| 2017/0218204 A1 | 8/2017 | Edwards et al. | |
| 2017/0252736 A1 | 9/2017 | Hirose et al. | |
| 2017/0253621 A1 | 9/2017 | Yoshikawa et al. | |
| 2018/0161764 A1 | 6/2018 | Okuno et al. | |
| 2018/0161765 A1 | 6/2018 | Kashima et al. | |
| 2018/0162887 A1 | 6/2018 | Okuno et al. | |
| 2018/0280953 A1 | 10/2018 | Iwanaga et al. | |
| 2018/0311643 A1 | 11/2018 | Okuno et al. | |
| 2018/0311656 A1 | 11/2018 | Yoshikawa et al. | |

FOREIGN PATENT DOCUMENTS

| | | | |
|---|---|---|---|
| JP | 8-269359 A | 10/1996 | |
| JP | 10-1621 A | 1/1998 | |
| JP | 2001-81394 A | 3/2001 | |
| JP | 2001-269573 A | 10/2001 | |
| JP | 2004-115541 A | 4/2004 | |
| JP | 2006-021112 A | 1/2006 | |
| JP | 2006-116462 A | 5/2006 | |
| JP | 2008-212841 A | 9/2006 | |
| JP | 2007-016111 A | 1/2007 | |
| JP | 2010-006629 A | 1/2010 | |
| JP | 2010-78861 A | 4/2010 | |
| JP | 2013-249229 A | 12/2013 | |
| JP | 2014-128768 A | 7/2014 | |
| JP | 2014-188417 A | 10/2014 | |
| JP | 2016-148786 A | 8/2016 | |
| WO | WO-2015177562 A1 * | 11/2015 | ........... C09C 1/3684 |

OTHER PUBLICATIONS

Office Action dated Dec. 7, 2016 in U.S. Appl. No. 15/208,278.
Office Action dated Dec. 7, 2016 in U.S. Appl. No. 15/212,021.
Office Action dated Jul. 2, 2019 in U.S. Appl. No. 15/484,407.
Office Action dated Jun. 20, 2017 in Japanese Application No. 2017-041023.
Office Action dated Jun. 20, 2017 in Japanese Application No. 2017-041024.
Office Action dated Mar. 16, 2018 in U.S. Appl. No. 15/208,278.
Office Action dated Mar. 19, 2019 in U.S. Appl. No. 15/484,407.
Office Action dated Mar. 8, 2018 in U.S. Appl. No. 15/212,021.
Office Action dated May 15, 2019 in Chinese Application No. 201610681883.6.
Office Action dated May 15, 2019 in Chinese Application No. 201610803424.0.
Office Action dated May 22, 2019 in U.S. Appl. No. 15/666,861.
Office Action dated Oct. 25, 2017 in U.S. Appl. No. 15/212,021.
Office Action dated Oct. 26, 2017 in U.S. Appl. No. 15/208,278.
Office Action dated Sep. 27, 2017 in U.S. Appl. No. 15/491,030.
Office Action dated Jul. 22, 2019 in U.S. Appl. No. 15/687,621.
Office Action dated Jan. 25, 2019 in U.S. Appl. No. 15/687,621.
Office Action dated Aug. 20, 2019 in U.S. Appl. No. 15/212,021.

* cited by examiner

US 10,668,456 B2

TITANIUM OXIDE PARTICLE, COMPOSITION FOR FORMING PHOTOCATALYST, AND PHOTOCATALYST

CROSS-REFERENCE TO RELATED APPLICATIONS

This application is based on and claims priority under 35 USC 119 from Japanese Patent Application No. 2016-240463 filed Dec. 12, 2016.

BACKGROUND

Technical Field

The present invention relates to a titanium oxide particle, a composition for forming a photocatalyst, and a photocatalyst.

SUMMARY

According to an aspect of the invention, there is provided a titanium oxide particle,
which includes a metal having a hydrocarbon group, which is bonded to a surface of the titanium oxide particle through an oxygen atom, and
absorbs light having a wavelength of 450 nm and light having a wavelength of 750 nm,
wherein an element ratio C/Ti between carbon C and titanium Ti on a surface of the titanium oxide particle is from 0.3 to 1.2, and
a reduced amount of C/Ti on the surface of the titanium oxide particle before and after irradiation with an ultraviolet ray having a wavelength of 352 nm and at an irradiation intensity of 1.3 mW/cm$^2$ for 20 hours is from 0.1 to 0.9.

DETAILED DESCRIPTION

Hereinafter, an exemplary embodiment which is an example of the invention will be described.

Titanium Oxide Particle

A titanium oxide particle according to the exemplary embodiment is subjected to surface treatment with a metal-containing compound which has a hydrocarbon group, and absorbs light having wavelengths of 450 nm and 750 nm in a visible absorption spectrum. In the titanium oxide particle, an element ratio C/Ti between carbon C and titanium Ti on the surface thereof is from 0.3 to 1.2. In a case where the titanium oxide particle is irradiated with an ultraviolet ray having a wavelength of 352 nm at an irradiation intensity of 1.3 mW/cm$^2$ for 20 hours, a reduced amount of the C/Ti element ratio on the surface of the titanium oxide particle before and after the irradiation with the ultraviolet ray is from 0.1 to 0.9.

The titanium oxide particle according to the exemplary embodiment is appropriately used as a photocatalyst.

Since the titanium oxide particle according to the exemplary embodiment has the above configuration, the titanium oxide particle also shows a high photocatalyst function even in a visible light region. The reason is guessed as follows.

Firstly, generally, an untreated titanium oxide particle as a photocatalyst absorbs ultraviolet light, and thus shows a photocatalyst function (photocatalyst activation). Thus, the untreated titanium oxide particle shows the photocatalyst function during a daytime on a sunny day on which sufficient ultraviolet light may be secured, but it is difficult that the untreated titanium oxide particle sufficiently shows the photocatalyst function during a night-time or in the shade. For example, in a case where the untreated titanium oxide particle is used as an exterior wall material, there is a tendency of stain resistance being deteriorated in accordance with a sunny place and a shade place. In a case where the untreated titanium oxide particle is used in an air cleaner, a water purifier, or the like, an additional mounting space, for example, in which a black light and the like which function as a light source of an ultraviolet ray is mounted in the device, may be required.

Recently, titanium oxide particles which show the photocatalyst function (photocatalyst activation) by absorbing visible light are also known. For example, a titanium oxide particle obtained by making a different type of metal (iron, copper, tungsten, or the like) adhere to titanium oxide, and a titanium oxide particle obtained by doping a nitrogen element, a sulfur element, or the like are known as such a visible light-absorption type titanium oxide particle. If the photocatalyst function is highly shown, there is a problem, for example, in that a binder such as an organic resin, which is used for fixing a photocatalyst material to the surface of a base material is decomposed and the base material itself is deteriorated.

Most of titanium oxide photocatalyst materials which have been known until now are hydrophilic. Thus, the materials have a tendency of low affinity with an organic or inorganic binder used for fixing a material, and particles are easily aggregated. Thus, a problem of deterioration of photocatalyst performance or separation from the binder easily has occurred. A method of treating the surface of a material with a surface treatment agent and the like is provided for this problem. If this method is performed, aggregation of particles or dispersibility into a binder is improved, but the surface treatment agent covers the surface of the photocatalyst material, thereby deteriorating the photocatalyst performance.

Accordingly, a titanium oxide particle which has small particle cohesiveness, good dispersibility into a binder, and a high photocatalyst function which is shown even in a visible light region is required.

For the requirement thereof, there is provided a titanium oxide particle subjected to surface treatment with a metal-containing compound which has a hydrocarbon group. The titanium oxide particle absorbs light having wavelengths of 450 nm and 750 nm in an ultraviolet visible absorption spectrum. A C/Ti element ratio on the surface of the titanium oxide particle is set to be from 0.3 to 1.2. In addition, in a case where the titanium oxide particle is irradiated with an ultraviolet ray having a wavelength of 352 nm and at an irradiation intensity of 1.3 mW/cm$^2$ for 20 hours, the reduced amount of the C/Ti element ratio on the surface of the titanium oxide particle before and after the irradiation with the ultraviolet ray is set to be from 0.1 to 0.9.

The titanium oxide particle which satisfies C/Ti on the surface of the particle has an appropriate C/Ti in comparison to a general titanium oxide particle which is subjected to surface treatment with a metal-containing compound which has a hydrocarbon group, or an untreated titanium oxide particle.

Since C/Ti on the surface of the titanium oxide particle is from 0.3 to 1.2, the carbon content of the hydrocarbon group and the like in the surface of the titanium oxide particle becomes appropriate. Light having wavelength of 450 nm and light having wavelength of 750 nm are sufficiently absorbed, and a high photocatalyst function is shown in the visible light region. Since the carbon content of the hydrocarbon group or the like on the surface of the titanium oxide particle is appropriate, the particle cohesiveness is small and the dispersibility into the binder is improved.

If C/Ti is less than 0.3, the carbon content on the surface of the titanium oxide particle is small. Thus, light having wavelengths of 450 nm and 750 nm is not sufficiently absorbed, the photocatalyst function in the visible light region is deteriorated, and the particle cohesiveness or the dispersibility into the binder is deteriorated. In addition, if the C/Ti element ratio is more than 1.2, the amount of the hydrocarbon group on the surface of the titanium oxide particle is large. Thus, an exposed amount of a portion at which titanium oxide is activated on the surface of the titanium oxide particle is reduced and the photocatalyst function in the visible light region is deteriorated.

In the titanium oxide particle which satisfies the reduced amount of C/Ti before and after the irradiation with the ultraviolet ray, the reduced amount of C/Ti indicates a large value in comparison to a general titanium oxide particle which is subjected to surface treatment with a metal-containing compound which has a hydrocarbon group, or an untreated titanium oxide particle.

Since the reduced amount of C/Ti on the surface of the titanium oxide particle before and after irradiation with an ultraviolet ray in a case where the titanium oxide particle is irradiated with the ultraviolet ray having a wavelength of 352 nm at an irradiation intensity of 1.3 mW/cm$^2$ for 20 hours is from 0.1 to 0.9, the carbon content of the hydrocarbon group and the like or the carbon content (carbon) obtained by carbonizing hydrocarbon, on the surface of the titanium oxide particle, is adequate. In addition, light having wavelength of 450 nm and light having wavelength of 750 nm are sufficiently absorbed, and the high photocatalyst function is shown in the visible light region. Since the hydrocarbon group and the like on the surface of the titanium oxide particle is appropriately decomposed by photocatalyst activation of the titanium oxide particle, deterioration of the binder or the base material is prevented.

If the reduced amount of C/Ti is more than 0.9, carbon in the hydrocarbon group or carbon obtained by carbonizing hydrocarbon, on the surface of the titanium oxide particle, is easily decomposed by the photocatalyst activation and thus is easily separated from the titanium oxide particle. Accordingly, the photocatalyst function in the visible light region is easily deteriorated. If the reduced amount of C/Ti is less than 0.1, the carbon content on the surface of the titanium oxide particle is small. Thus, light having a wavelength of 450 nm and light having a wavelength of 750 nm are not sufficiently absorbed and the photocatalyst function in the visible light region is deteriorated. Since the small amount of the hydrocarbon group and the like on the surface of the titanium oxide particle is decomposed, a function of preventing deterioration of the binder or the base material is deteriorated.

The titanium oxide particle which satisfies the numerical range for C/Ti and the reduced amount of C/Ti before and after irradiation with an ultraviolet ray, on the surface of the particle, is prepared, for example, in a manner that some hydrocarbon groups in a titanium oxide particle subjected to surface treatment with a metal-containing compound which has a hydrocarbon group are oxidized and decomposed by treatment such as heating. Regarding such a titanium oxide particle, it is considered that hydrocarbon and carbon obtained by carbonizing hydrocarbon are provided in a pore of the titanium oxide particle, that is, hydrocarbon and carbon obtained by carbonizing hydrocarbon are buried from the surface layer over the inside of the titanium oxide particle.

It is considered that the buried carbon absorbs visible light along with ultraviolet light and functions as a charge separation material and a promotor.

That is, it is considered as follows. Carbon provided in the pore of the titanium oxide particle accelerates excitation of an electron on the surface of the titanium oxide particle by absorbing visible light along with ultraviolet light, and a probability of recombining the excited electron and a hole is reduced. Accordingly, the photocatalyst function is improved.

Generally, an untreated titanium oxide particle has a tendency of a low degree of freedom in control for a particle diameter, particle diameter distribution, and a particle shape, and a tendency of high particle cohesiveness. Thus, the untreated titanium oxide particle has bad dispersibility of the titanium oxide particle in a resin, and, in a liquid, and has a tendency to 1) to be difficult to show the photocatalyst function, and 2) to easily deteriorate transparency of a film or the like and uniformity of a film obtained by coating with a coating liquid.

However, since the titanium oxide particle according to the exemplary embodiment has a hydrocarbon group derived from a metal-containing compound, on the surface, dispersibility of primary particles in the coated film is also secured. Thus, a substantially-uniform coated film may be formed. Light abuts on the titanium oxide particle with high efficiency and the photocatalyst function is easily shown. Transparency of a film or the like and uniformity of a film obtained by coating with a coating liquid is also improved, and thus design properties are also ensured. As a result, for example, when the surface of an exterior wall material, a plate, a pipe, and nonwoven fabric (nonwoven fabric made of ceramics or the like) is coated with a coating material including the titanium oxide particle, an occurrence of aggregation of titanium oxide particles and an occurrence of coating defects are prevented, and the photocatalyst function is easily shown for a long term.

From the above descriptions, it is guessed that, with the above configuration, the titanium oxide particle according to the exemplary embodiment has excellent particle dispersibility, and shows the high photocatalyst function even in the visible light region.

Details of the titanium oxide particle according to the exemplary embodiment will be described below.

Untreated Titanium Oxide Particle

Examples of an untreated titanium oxide particle (titanium oxide particle as a target of surface treatment) include particles of titanium oxide of a brookite type, an anatase type, a rutile type, and the like. The titanium oxide particle may have a single crystal structure of brookite, anatase, rutile, and the like or may have a mixed crystal structure in which the above crystals are provided together.

The untreated titanium oxide particle according to the exemplary embodiment is a titanium oxide particle which is not subjected to surface treatment with a metal-containing compound having a hydrocarbon group. The surface treatment may include any type of surface treatment. However, it is preferable that the titanium oxide particle according to the exemplary embodiment is a titanium oxide particle subjected to surface treatment with only a metal-containing compound having a hydrocarbon group.

A preparing method of the untreated titanium oxide particle is not particularly limited. However, a chlorine method (vapor phase method), and a sulfuric acid method (liquid phase method) are exemplified.

An example of the chlorine method (vapor phase method) is as follows. Firstly, rutile ore which is a raw material is caused to react with coke and chlorine. After the reactant is exposed to gaseous titanium tetrachloride once, cooling is performed, thereby a titanium tetrachloride liquid is obtained. Then, obtained titanium tetrachloride liquid is caused to react with oxygen at a high temperature, and then a chlorine gas is separated. Thus, an untreated titanium oxide is obtained.

An example of the sulfuric acid method (liquid phase method) is as follows. Firstly, ilmenite ore ($FeTiO_3$) or titanium slag which is a raw material is dissolved in concentrated sulfuric acid, and an iron component which is an impurity is separated in a form of iron sulfate ($FeSO_4$), thereby titanium oxysulfate ($TiOSO_4$) is obtained. Then, titanium oxysulfate ($TiOSO_4$) is subjected to hydrolysis, and thus is precipitated in a form of titanium oxyhydroxide ($TiO(OH)_2$). This precipitate is washed and dried, and a dried matter is baked. Thus, an untreated titanium oxide is obtained.

As a method of preparing an untreated titanium oxide particle, additionally, a sol-gel method using titanium alkoxide and a method of baking metatitanic acid are provided. Regarding a crystal structure of the titanium oxide particle, the crystal structure is changed to brookite, anatase, or rutile by a baking temperature (for example, heating in a range of 400° C. to 1,200° C.). Thus, an untreated titanium oxide particle having a desired crystal structure is obtained by the baking temperature.

Metal-Containing Compound

The metal-containing compound has a hydrocarbon group. As a hydrocarbon group included in the metal-containing compound, an aliphatic hydrocarbon group or an aromatic hydrocarbon group which has 1 to 20 carbon atoms (preferably 1 to 18 carbon atoms, more preferably 4 to 12 carbon atoms, and further preferably 4 to 10 carbon atoms) and is saturated or unsaturated is exemplified.

The hydrocarbon group may or may not be directly combined to metal in the metal-containing compound. However, from a viewpoint of showing a high photocatalyst function and improving dispersibility, the hydrocarbon group is preferably directly combined.

As metal of the metal-containing compound having the hydrocarbon group, a metal atom selected from the group consisting of silicon, titanium, and aluminum is preferable, and silicon is particularly preferable. That is, as the metal-containing compound having a hydrocarbon group, a silane compound having a hydrocarbon group is particularly preferable.

Examples of the silane compound include a chlorosilane compound, an alkoxysilane compound, and a silazane compound (hexamethyldisilazane and the like).

Among these substances, from a viewpoint of showing a high photocatalyst function and improving dispersibility, a compound represented by a formula of $R^1{}_nSiR^2{}_m$ is preferable as the silane compound.

In the formula of $R^1{}_nSiR^2{}_m$, $R^1$ represents an aliphatic hydrocarbon group or an aromatic hydrocarbon group which has 1 to 20 carbon atoms and is saturated or unsaturated, $R^2$ represents a halogen atom or an alkoxy group, n represents an integer of 1 to 3, and m represents an integer of 1 to 3, provided that n+m=4 is satisfied. In a case where n represents an integer of 2 or 3, plural $R^1$s may be the same or different. In a case where m represents an integer of 2 or 3, plural $R^2$s may be the same or different.

The aliphatic hydrocarbon group represented by $R^1$ may have any of a straight chain shape, a branched chain shape, and a ring shape. However, from a viewpoint of dispersibility, a straight chain shape or a branched chain shape is preferable, and a straight chain shape is more preferable. From a viewpoint of showing a high photocatalyst function and improving dispersibility, the aliphatic hydrocarbon group has preferably from 1 to 18 carbon atoms, more preferably from 4 to 12 carbon atoms, and further preferably from 4 to 10 carbon atoms. The aliphatic hydrocarbon group may be a saturated or unsaturated aliphatic hydrocarbon group. However, from a viewpoint of showing a high photocatalyst function and improving dispersibility, a saturated aliphatic hydrocarbon group is preferable, and an alkyl group is more preferable.

Examples of the saturated aliphatic hydrocarbon group include a straight-chain alkyl group (a methyl group, an ethyl group, a propyl group, a butyl group, a pentyl group, a hexyl group, a heptyl group, an octyl group, a nonyl group, a decyl group, a dodecyl group, a hexadecyl group, an icosyl group, and the like); a branched chain alkyl group (an isopropyl group, an isobutyl group, an isopentyl group, a neopentyl group, a 2-ethylhexyl group, a tertiary butyl group, a tertiary pentyl group, an isopentadecyl group, and the like); and a cyclic alkyl group (a cyclopropyl group, a cyclopentyl group, a cyclohexyl group, a cycloheptyl group, a cyclooctyl group, a tricyclodecyl group, a norbornyl group, an adamantyl group, and the like).

Examples of the unsaturated aliphatic hydrocarbon group include an alkenyl group (a vinyl group (ethenyl group), a 1-propenyl group, a 2-propenyl group, a 2-butenyl group, a 1-butenyl group, a 1-hexenyl group, a 2-dodecenyl group, a pentenyl group, and the like); and an alkynyl group (an ethynyl group, a 1-propynyl group, a 2-propynyl group, a 1-butynyl group, a 3-hexynyl group, a 2-dodecynyl group, and the like).

The aliphatic hydrocarbon group also includes a substituted aliphatic hydrocarbon group. Examples of a substituent which may be substituted with the aliphatic hydrocarbon group include an epoxy group, a mercapto group, a methacryloyl group, and an acryloyl group.

As the aromatic hydrocarbon group represented by $R^1$, an aromatic hydrocarbon group having 6 to 27 carbon atoms (preferably 6 to 18) is exemplified.

Examples of the aromatic hydrocarbon group include a phenyl group, a biphenyl group, a terphenyl group, a naphthalenyl group, and an anthracenyl group.

The aromatic hydrocarbon group also includes a substituted aromatic hydrocarbon group. Examples of the substituent which the aromatic hydrocarbon group may have include an epoxy group, a glycidyl group, a mercapto group, a methacryloyl group, and an acryloyl group.

Examples of the halogen atom represented by $R^2$ include a fluorine atom, a chlorine atom, a bromine atom, and an iodine atom. Among these atoms, as the halogen atom, a chlorine atom, a bromine atom, or an iodine atom is preferable.

Examples of the alkoxy group represented by $R^2$ include an alkoxy group having 1 to 10 carbon atoms (preferably 1 to 8, and more preferably 3 to 8).

Examples of the alkoxy group include a methoxy group, an ethoxy group, an isopropoxy group, a t-butoxy group, a n-butoxy group, a n-hexyloxy group, a 2-ethylhexyloxy group, and a 3,5,5-trimethylhexyloxy group.

The alkoxy group also includes a substituted alkoxy group. Examples of the substituent which the alkoxy group may have include a halogen atom, a hydroxyl group, an amino group, an alkoxy group, an amide group, and a carbonyl group.

As the compound represented by the formula of $R^1{}_n SiR^2{}_m$, a compound in which $R^1$ represents a saturated hydrocarbon group is preferable from a viewpoint of showing a high photocatalyst function and improving dispersibility. In particular, as the compound represented by the formula of $R^1{}_n SiR^2{}_m$, a compound in which $R^1$ represents a saturated aliphatic hydrocarbon group having 1 to 20 carbon atoms, $R^2$ represents a halogen atom or an alkoxy group, n represents an integer of 1 to 3, and m represents an integer of 1 to 3, provided that n+m=4 is satisfied, is preferable.

Specific examples of the compound represented by the formula of $R^1{}_n SiR^2{}_m$ include vinyltrimethoxysilane, propyl trimethoxysilane, i-butyltrimethoxysilane, n-butyltrimethoxysilane, n-hexyltrimethoxysilane, n-octyltrimethoxysilane, n-dodecyltriethoxysilane, phenyltrimethoxysilane, 3-glycidoxypropyltrimethoxysilane, tetramethoxysilane, methyltrimethoxysilane, dimethyl dimethoxysilane, diphenyldimethoxysilane, o-methylphenyltrimethoxysilane, p-methylphenyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyl triethoxysilane, γ-methacryloxypropyltrimethoxysilane, γ-glycidyloxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl) aminopropyltrimethoxysilane, and γ-(2-aminoethyl) aminopropylmethyldimethoxysilane.

The silane compound may be singly used or may be used in combination of two types or more.

Among these substances, from a viewpoint of showing a high photocatalyst function and improving dispersibility, the hydrocarbon group in the silane compound is preferably an aliphatic hydrocarbon group, more preferably a saturated aliphatic hydrocarbon group, and particularly preferably an alkyl group.

From a viewpoint of showing a high photocatalyst function and improving dispersibility, the hydrocarbon group in the silane compound has preferably 1 to 18 carbon atoms, more preferably 4 to 12 carbon atoms, and particularly preferably 4 to 10 carbon atoms.

Examples of a titanium compound which has Ti as a metal atom in the metal-containing compound and has a hydrocarbon group include a titanate coupling agent such as isopropyl triisostearoyl titanate, tetraoctyl bis(ditridecyl phosphite)titanate, and bis(dioctyl pyrophosphate)oxyacetate titanate; and titanium chelate such as di-i-propoxy bis(ethyl acetoacetate) titanium, di-i-propoxy bis(acetylacetonato)titanium, di-i-propoxy bis(triethanolaminate)titanium, di-i-propoxy titanium diacetate, and di-i-propoxy titanium dipropionate.

Examples of an aluminum compound which has a metal atom of the metal-containing compound is Al and has a hydrocarbon group include alkyl aluminate such as triethoxyaluminum, tri-i-propoxyaluminum, and tri-sec-butoxyaluminum; aluminum chelate such as di-i-propoxy.mono-sec-butoxyaluminum, and di-i-propoxyaluminum.ethylacetacetate; and an aluminum coupling agent such as acetoalkoxyaluminum diisopropylate.

Characteristics of Titanium Oxide Particle

The titanium oxide particle according to the exemplary embodiment absorbs light having wavelengths of 450 nm and 750 nm in a visible absorption spectrum.

From a viewpoint of showing a high photocatalyst function even in the visible light region, it is preferable that the titanium oxide particle according to the exemplary embodiment absorbs light having wavelengths of 450 nm, 600 nm, and 750 nm in the visible absorption spectrum. It is more preferable that the titanium oxide particle absorbs light having a whole range of a wavelength of 450 nm to 750 nm in the visible absorption spectrum. It is particularly preferable that the titanium oxide particle absorbs light having a whole range of a wavelength of 400 nm to 800 nm in the visible absorption spectrum.

Regarding the titanium oxide particle, from a viewpoint of showing a high photocatalyst function even in the visible light region, in the ultraviolet visible absorption spectrum, when an absorbance at a wavelength of 350 nm is set to 1, the absorbance at a wavelength of 450 nm is preferably equal to or more than 0.02 (preferably equal to or more than 0.1). In addition, it is more preferable that an absorbance at a wavelength of 450 nm is equal to or more than 0.2 (preferably equal to or more than 0.3), and an absorbance at a wavelength of 750 nm is equal to or more than 0.02 (preferably equal to or more than 0.1).

The ultraviolet visible absorption spectrum is measured by a method as follows. Firstly, a titanium oxide particle as a measurement target is dispersed in tetrahydrofuran, and then the resultant dispersion is applied onto a glass substrate and drying is performed at 24° C. in the air. Measurement is performed in arrangement of diffusion and reflection, and theoretical absorbance is obtained by Kubelka-Munk conversion. Regarding a diffusion and reflection spectrum, measurement is performed on a range of a wavelength from 200 nm to 900 nm by using reflectance and by using a spectrophotometer (U-4100 manufactured by Hitachi High-Technologies Corporation) [measured under measurement conditions; a scan speed of 600 nm, a slit width of 2 nm, and a sampling interval of 1 nm, in a total-reflectance measurement mode]. Then, Kubelka-Munk conversion is performed so as to obtain a visible absorption spectrum.

The titanium oxide particle according to the exemplary embodiment has C/Ti of 0.3 to 1.2 on the surface thereof. In a case where the titanium oxide particle is irradiated with the ultraviolet ray having a wavelength of 352 nm and at an irradiation intensity of 1.3 mW/cm$^2$ for 20 hours, the changed amount of C/Ti on the surface of the titanium oxide particle before and after the irradiation with the ultraviolet ray is from 0.1 to 0.9.

Specifically, for example, from a viewpoint of showing a high photocatalyst function even in the visible light region, the C/Ti on the surface of the titanium oxide particle is preferably from 0.4 to 1.1, more preferably from 0.5 to 1.0, and particularly preferably from 0.6 to 0.9.

The changed amount of C/Ti on the surface of the particle before and after the irradiation with an ultraviolet ray is preferably from 0.2 to 0.85 and more preferably from 0.25 to 0.8.

C/Ti on the surface of the titanium oxide particle is measured by a method as follows. Firstly, measurement is performed on the titanium oxide particle as a measurement target by using an X-ray photoelectron spectroscopy (XPS) analyzer (JPS-9000MX manufactured by JEOL Ltd.). The measurement is performed in a manner that a MgKα ray is used as an X-ray source, an acceleration voltage is set to 10 kV, and an emission current is set to 20 mA. C/Ti is calculated from intensity at a peak of each element.

Regarding irradiation of the surface of the titanium oxide particle with an ultraviolet ray, irradiation is performed with an ultraviolet ray having a wavelength of 352 nm and at an irradiation intensity of 1.3 mW/cm$^2$. It is assumed that irradiation is performed under the conditions where the temperature of the titanium oxide particle when irradiation with an ultraviolet ray starts is from 15° C. to 30° C. and an irradiation time is 20 hours.

After the irradiation with the ultraviolet ray, C/Ti is measured by the above-described method and the reduced amount of C/Ti before and after the irradiation with the ultraviolet ray is calculated.

The volume average particle diameter of titanium oxide particles according to the exemplary embodiment is preferably 10 nm to 1 µm, more preferably 10 nm to 200 nm, and further preferably 15 nm to 200 nm.

If the volume average particle diameter of the titanium oxide particles is equal to or more than 10 nm, aggregation of the titanium oxide particles is prevented, and the photocatalyst function is easily highly shown. If the volume average particle diameter of the titanium oxide particles is set to be equal to or less than 1 µm, a percentage of a specific surface area to an amount is increased, and the photocatalyst function is easily highly shown. Thus, if the volume average particle diameter of the titanium oxide particles is set to be in the above range, a high photocatalyst function is easily shown in the visible light region.

The volume average particle diameter of the titanium oxide particles is measured by NANOTRACK UPA-ST (a dynamic light scattering type particle diameter measuring device manufactured by Microtrac Bel). Regarding a measurement condition, the concentration of a sample is set to be 20%, and a measurement period is set to be 300 seconds. This device measures a particle diameter by using a Brownian motion in dispersoid. The device irradiates a solution with a laser beam, and detects scattered light, so as to measure a particle diameter.

Cumulative distribution of a volume of each particle from a small particle diameter side, in a divided particle diameter range (channel) is drawn based on particle diameter distribution which is measured by a dynamic light scattering type particle diameter measuring device. Then, a particle diameter causing the accumulation to be 50% is obtained as a volume average particle diameter.

Preparing Method of Titanium Oxide Particle

A preparing method of the titanium oxide particle according to the exemplary embodiment is not particularly limited. However, it is preferable that the preparing method includes a process of performing surface treatment on an untreated titanium oxide particle with a metal-containing compound having a hydrocarbon group, and a process of heating the titanium oxide particle during or after the process of performing surface treatment on the untreated titanium oxide particle.

Firstly, surface treatment of an untreated titanium oxide particle with a metal-containing compound will be described.

A method of performing surface treatment on an untreated titanium oxide particle with a metal-containing compound is not particularly limited. For example, a method in which a metal-containing compound itself is brought into contact with an untreated titanium oxide particle, and a method in which a treatment liquid in which the metal-containing compound is dissolved in a solvent is brought into contact with an untreated titanium oxide particle are exemplified. Specifically, for example, a method in which a metal-containing compound itself or a treatment liquid is added to a dispersion in which untreated titanium oxide particles are dispersed in a solvent, under stirring, and a method in which addition (dropping, ejecting, and the like) to an untreated titanium oxide particle being in a state of flowing with stirring by HENSCHEL MIXER or the like is performed are exemplified.

With the above method, a reactive group (for example, a hydrolyzable group) in the metal-containing compound reacts with a hydrolyzable group (a hydroxyl group, a halogeno group, an alkoxy group, and the like) present on the surface of an untreated titanium oxide particle, and thus the surface treatment of the untreated titanium oxide particle with the metal-containing compound is performed.

Here, examples of a solvent for dissolving the metal-containing compound include an organic solvent (for example, a hydrocarbon solvent, an ester solvent, an ether solvent, a halogen solvent, and an alcohol solvent), water, and a solvent mixture thereof.

Examples of the hydrocarbon solvent include toluene, benzene, xylene, hexane, octane, hexadecane, and cyclohexane. Examples of the ester solvent include methyl acetate, ethyl acetate, isopropyl acetate, and amyl acetate. Examples of the ether solvent include dibutyl ether and dibenzyl ether. Examples of the halogen solvent include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol solvent include methanol, ethanol, and i-propyl alcohol. Examples of the water include tap water, distilled water, and pure water.

As the solvent, in addition to the above solvents, a solvent such as dimethylformamide, dimethylacetamide, dimethylsulfoxide, acetic acid, and sulfuric acid may be used.

In the treatment liquid in which the metal-containing compound is dissolved in a solvent, the concentration of the metal-containing compound is preferably 0.05 mol/L to 500 mol/L, and more preferably 0.5 mol/L to 10 mol/L.

Regarding the condition for surface treatment of a titanium oxide particle with the metal-containing compound, from a viewpoint of showing a high photocatalyst function and improving dispersibility, the following conditions may be provided. An untreated titanium oxide particle may be subjected to surface treatment with a metal-containing compound which is 10% by weight to 100% by weight (preferably, 20% by weight to 75% by weight, and more preferably 25% by weight to 50% by weight) with respect to the untreated titanium oxide particle. If the treated amount of the metal-containing compound is set to be equal to or more than 10% by weight, a high photocatalyst function is easier shown even in the visible light region, and the dispersibility is also easily improved. If the treated amount of the metal-containing compound is set to be equal to or less than 100% by weight, metal (M) is prevented from being present on the surface (Ti—O—) of the titanium oxide particle in an excessive amount, and deterioration of the photocatalyst function by surplus silicon (Si) is easily prevented.

The temperature of the surface treatment of an untreated titanium oxide particle with the metal-containing compound is preferably 15° C. to 150° C., and more preferably 20° C. to 100° C. The surface treatment period is preferably 10 minutes to 120 minutes, and more preferably 30 minutes to 90 minutes.

After the surface treatment of an untreated titanium oxide particle with the metal-containing compound, drying treatment may be performed. A method of the drying treatment is not particularly limited. For example, a known drying method such as a vacuum drying method and a spray drying method is used. A drying temperature is preferably 20° C. to 150° C.

Next, heating treatment will be described.

The heating treatment is performed in the middle of the process of performing surface treatment on an untreated titanium oxide particle or performed after the process of performing surface treatment on an untreated titanium oxide particle. Specifically, when an untreated titanium oxide particle is surface-treated with the metal-containing compound, when drying treatment after surface treatment is performed, or after drying treatment, the heating treatment may be separately performed. However, because the titanium oxide particle is required to sufficiently react with the metal-containing compound before the heating treatment is performed, the heating treatment is preferably separately performed when drying treatment after surface treatment is performed or after the drying treatment. It is more preferable that the heating treatment is separately performed after the drying treatment is performed in order that surface treatment and drying of the titanium oxide particle are appropriately performed.

From a viewpoint of showing a high photocatalyst function and improving dispersibility, a temperature of the heating treatment is preferably 180° C. to 500° C., more preferably 200° C. to 450° C., and further preferably 250° C. to 400° C.

In a case where heating treatment is performed in the middle of the process of performing surface treatment on an untreated titanium oxide particle, the metal-containing compound is caused to sufficiently react at the temperature of the surface treatment which has been performed in advance, and then, heating treatment is performed at the temperature of the heating treatment. In a case where heating treatment is performed in drying treatment after surface treatment, the temperature of the drying treatment is used as the temperature of the heating treatment.

From a viewpoint of showing a high photocatalyst function and improving dispersibility, a period for the heating treatment is preferably 10 minutes to 300 minutes, and more preferably 30 minutes to 120 minutes.

The method of the heating treatment is not particularly limited. A known heating method, for example, heating by an air furnace, a kiln (roller hearth kiln, shuttle kiln, or the like), a radiant heating furnace, and the like, heating by a laser beam, an infrared ray, UV, a microwave, or the like is used.

With the above processes, the titanium oxide particle according to the exemplary embodiment is appropriately obtained.

Composition for Forming Photocatalyst

A composition for forming a photocatalyst according to the exemplary embodiment contains the titanium oxide particle according to the exemplary embodiment and at least one compound selected from the group consisting of a dispersion medium and a binder.

Examples of a form of the composition for forming a photocatalyst according to the exemplary embodiment include a dispersion which contains the titanium oxide particle according to the exemplary embodiment and a dispersion medium, and a composition which contains the titanium oxide particle according to the exemplary embodiment, and an organic or inorganic binder.

The dispersion may have a paste shape having high viscosity.

As the dispersion medium, water, an organic solvent, and the like are preferably used.

Examples of the water include tap water, distilled water, and pure water.

The organic solvent is not particularly limited, and for example, a hydrocarbon solvent, an ester solvent, an ether solvent, a halogen solvent, and an alcohol solvent are exemplified.

From a viewpoint of dispersion stability and storage stability, the dispersion preferably contains at least one type of compound selected from the group consisting of a dispersing agent and a surfactant. As the dispersing agent and the surfactant, well-known materials are used.

The binder used in the composition is not particularly limited. Examples of the binder include fluorine resin, silicone resin, polyester resin, acrylic resin, styrene resin, acrylonitrile/styrene copolymer resin, acrylonitrile/butadiene/styrene copolymer (ABS) resin, epoxy resin, polycarbonate resin, polyamide resin, polyamine resin, polyurethane resin, polyether resin, polysulfide resin, polyphenol resin, a compound thereof, an organic binder such as resin obtained by silicone-modifying or halogen-modifying the above resins, and an inorganic binder such as a glass, ceramic, metal powder.

The dispersion may contain the binder in a form of an emulsion.

The composition for forming a photocatalyst according to the exemplary embodiment may contain other components other than the above-described components.

Well-known additives are used as the other components, for example, a promotor, a coloring material, a filler, an antiseptic agent, a defoaming agent, an adhesion-enhancing agent, and a thickener are exemplified.

The composition for forming a photocatalyst according to the exemplary embodiment may singly contain the titanium oxide particle according to the exemplary embodiment or may contain two types or more of titanium oxide particles.

In the composition for forming a photocatalyst according to the exemplary embodiment, the content of the titanium oxide particle according to the exemplary embodiment is not particularly limited, and may be appropriately selected in accordance with various forms such as a dispersion and a resin composition, and a desired amount of the photocatalyst.

A preparing method of a photocatalyst using the composition for forming a photocatalyst according to the exemplary embodiment, or a preparing method of a structure having the photocatalyst are not particularly limited, and well-known applying methods are used.

Examples of the applying method of the composition for forming a photocatalyst according to the exemplary embodiment include a spin coating method, a dip coating method, a flow coating method, a spray coating method, a roll coating method, a brush coating method, a sponge coating method, a screen printing method, and an ink jet printing method.

Photocatalyst and Structure

The photocatalyst according to the exemplary embodiment contains or is formed from the titanium oxide particle according to the exemplary embodiment.

A structure according to the exemplary embodiment contains the titanium oxide particle according to the exemplary embodiment.

The photocatalyst according to the exemplary embodiment may be a photocatalyst formed from only the titanium oxide particle according to the exemplary embodiment, a photocatalyst obtained by mixing a promotor to the titanium oxide particle according to the exemplary embodiment, or a photocatalyst obtaining by fixing the titanium oxide particle according to the exemplary embodiment to a desired shape by using an adhesive or a pressure-sensitive adhesive.

From a viewpoint of photocatalyst activation, the structure according to the exemplary embodiment preferably has at least the titanium oxide particle according to the exemplary embodiment, on the surface.

The structure according to the exemplary embodiment preferably has the titanium oxide particle according to the exemplary embodiment, as a photocatalyst.

The structure according to the exemplary embodiment is preferably a structure in which at least the titanium oxide particle according to the exemplary embodiment is provided at at least a portion of the surface of a base material, and is preferably a structure formed by applying the composition for forming a photocatalyst according to the exemplary embodiment, to at least a portion of the surface of the base material.

In the structure, the amount of the applied composition for forming a photocatalyst according to the exemplary embodiment is not particularly limited, and may be selected in accordance with a desire.

Further, in the structure according to the exemplary embodiment, the titanium oxide particle according to the exemplary embodiment may be adhered or fixed to the surface of the base material. However, from a viewpoint of durability of the photocatalyst, the titanium oxide particle is preferably fixed to the surface of the base material. A fixing method is not particularly limited, and well-known fixing methods are used.

As a base material used in the exemplary embodiment, various materials are exemplified regardless of an inorganic material and an organic material. The shape of the base material is also not limited.

Preferable examples of the base material include metal, ceramic, glass, plastic, rubber, stone, cement, concrete, textile, fabric, wood, paper, and combination thereof, a stacked member, and an object having at least one coated film on the surface thereof.

Examples of the base material which is preferable from a viewpoint of a use include a building material, an exterior material, a window frame, window glass, a mirror, a table, dishes, a curtain, lens, a prism, exterior and painting of a vehicle, exterior of a mechanical device or a product, a dustproof cover and painting, a traffic sign, various display devices, an advertising tower, a sound insulation wall for road, a sound insulation wall for railway, a bridge, exterior and painting of a guard rail, interior and painting of a tunnel, an insulator, a solar cell cover, a solar water heater collector cover, a polymer film, a polymer sheet, a filter, an indoor signboard, an outdoor signboard, a vehicle lighting lamp cover, an outdoor lighting equipment, an air purifier, a water purifier, medical equipment, and a nursing care product.

EXAMPLES

The present invention will be more specifically described by using examples. However, the examples do not limit the present invention. "A part" or "%" indicates a weight basis as long as particular statement is not made.

Example 1

40% by weight of isobutyltrimethoxysilane with respect to the not-treated titanium oxide particles is dropped into a dispersion in which a commercial anatase type titanium oxide particle ("SSP-20 (manufactured by Sakai Chemical Industry Co., Ltd.)", volume average particle diameter of 12 nm) is dispersed in methanol, so as to perform reaction at 60° C. for one hour. Then, ejection and drying is performed at an outer port temperature of 120° C., thereby dry powder is obtained. Heating treatment is performed on the obtained dry powder in an electric furnace at 400° C. for one hour, and thus a titanium oxide particle 1 is obtained.

Example 2

A titanium oxide particle 2 is obtained in the same manner as in Example 1 except that isobutyltrimethoxysilane in Example 1 is changed to hexyltrimethoxysilane.

Example 3

A titanium oxide particle 3 is obtained in the same manner as in Example 1 except that isobutyltrimethoxysilane in Example 1 is changed to decyltrimethoxysilane.

Example 4

A titanium oxide particle 4 is obtained in the same manner as in Example 2 except that an added amount of hexyltrimethoxysilane in Example 2 is changed from 40 parts to 50 parts.

Example 5

A titanium oxide particle 5 is obtained in the same manner as in Example 2 except that the temperature in the electric furnace when dried particulate powder in Example 2 is heated is changed from 400° C. to 250° C.

Example 6

A titanium oxide particle 6 is obtained in the same manner as in Example 1 except that the temperature in the electric furnace when dried particulate powder in Example 1 is heated is changed from 400° C. to 500° C.

Example 7

A titanium oxide particle 7 is obtained in the same manner as in Example 2 except that an added amount of hexyltrimethoxysilane in Example 2 is changed from 40 parts to 25 parts.

Example 8

A titanium oxide particle 8 is obtained in the same manner as in Example 2 except that an added amount of hexyltrimethoxysilane in Example 2 is changed from 40 parts to 75 parts.

Example 9

A titanium oxide particle 9 is obtained in the same manner as in Example 2 except that the anatase type titanium oxide particle in Example 2 is changed to commercial rutile type titanium oxide particle ("STR-100N (manufactured by Sakai Chemical Industry Co., Ltd.)", volume average particle diameter of 16 nm).

Example 10

A titanium oxide particle 10 is obtained in the same manner as in Example 2 except that the anatase type titanium oxide particle in Example 2 is changed to an anatase type titanium oxide particle (volume average particle diameter of 80 nm) prepared by a sol-gel method.

Example 11

A titanium oxide particle 11 is obtained in the same manner as in Example 2 except that an added amount of hexyltrimethoxysilane in Example 2 is changed from 40 parts to 10 parts.

Example 12

A titanium oxide particle 12 is obtained in the same manner as in Example 1 except that isobutyltrimethoxysilane in Example 1 is changed to methyltrimethoxysilane.

Example 13

A titanium oxide particle 13 is obtained in the same manner as in Example 1 except that isobutyltrimethoxysilane in Example 1 is changed to hexamethyldisilazane.

Example 14

A titanium oxide particle 14 is obtained in the same manner as in Example 1 except that 40 parts of isobutyltrimethoxysilane as a surface treatment agent in Example 1 are changed to 30 parts of dodecyltrimethoxysilane.

Example 15

A titanium oxide particle 15 is obtained in the same manner as in Example 1 except that isobutyltrimethoxysilane in Example 1 is changed to phenyltrimethoxysilane.

Example 16

A titanium oxide particle 16 is obtained in the same manner as in Example 2 except that the temperature in the electric furnace when dried particulate powder is heated in Example 2 is changed from 400° C. to 180° C.

Example 17

A titanium oxide particle 17 is obtained in the same manner as in Example 2 except that the anatase type titanium oxide particle in Example 2 is changed to an anatase type titanium oxide particle (volume average particle diameter of 200 nm) prepared by a sol-gel method.

Example 18

A titanium oxide particle 18 is obtained in the same manner as in Example 2 except that the anatase type titanium oxide particle in Example 2 is changed to an anatase type titanium oxide particle (volume average particle diameter of 800 nm) prepared by a sol-gel method.

Example 19

A titanium oxide particle 19 is obtained in the same manner as in Example 1 except that hexyltrimethoxysilane in Example 10 is changed to isobutyltrimethoxysilane.

Example 20

A titanium oxide particle 20 is obtained in the same manner as in Example 1 except that isobutyltrimethoxysilane in Example 1 is changed to isopropyl triisostearoyl titanate (TTS, manufactured by Ajinomoto Co., Inc.).

Example 21

A titanium oxide particle 21 is obtained in the same manner as in Example 1 except that isobutyltrimethoxysilane in Example 1 is changed to acetoalkoxyaluminum diisopropylate (AL-M, manufactured by Ajinomoto Co., Inc., an alkoxy group in acetoalkoxy is an oxadecyloxy group).

Comparative Example 1

A commercial anatase type titanium oxide particle ("SSP-20 (manufactured by Sakai Chemical Industry Co., Ltd.", volume average particle diameter of 12 nm)) itself is used as a titanium oxide particle C1.

Comparative Example 2

A commercial rutile type titanium oxide particle ("STR-100N (manufactured by Sakai Chemical Industry Co., Ltd.", volume average particle diameter of 16 nm)) itself is used as a titanium oxide particle C2.

Comparative Example 3

The commercial anatase type titanium oxide particle ("SSP-20 (manufactured by Sakai Chemical Industry Co., Ltd.", volume average particle diameter of 12 nm)) is heated at 400° C. in an electric furnace for one hour, thereby a titanium oxide particle C3 is obtained.

Comparative Example 4

The commercial rutile type titanium oxide particle ("STR-100N (manufactured by Sakai Chemical Industry Co., Ltd.", volume average particle diameter of 16 nm)) is heated at 400° C. in an electric furnace for one hour, thereby a titanium oxide particle C4 is obtained.

Comparative Example 5

A titanium oxide particle C5 is obtained in the same manner as in Example 1 except that an added amount of isobutyltrimethoxysilane in Example 1 is changed from 40 parts to 5 parts.

Comparative Example 6

A titanium oxide particle C6 is obtained in the same manner as in Example 1 except that an added amount of isobutyltrimethoxysilane in Example 1 is changed from 40 parts to 120 parts.

Comparative Example 7

A titanium oxide particle C7 is obtained in the same manner as in Example 1 except that the temperature in the electric furnace when dried particulate powder in Example 1 is heated is changed from 400° C. to 600° C.

Comparative Example 8

A titanium oxide particle C8 is obtained in the same manner as in Example 1 except that the temperature in the electric furnace when dried particulate powder in Example 1 is heated is changed from 400° C. to 160° C.

Comparative Example 9

A titanium oxide particle C9 is obtained in the same manner as in Example 1 except that dried particulate powder in Example 1 is not heated.

Measurement

Regarding the particles obtained in the examples, ultraviolet-visible absorption spectrum characteristics are confirmed. The particles in Examples 1 to 21 and Comparative Examples 5 to 7 absorb light in a range of a wavelength from 400 nm to 800 nm. (Mark as "UV-Vis characteristics" in Tables 1 and 2: an absorbance of a wavelength of 450 nm, an absorbance of a wavelength of 600 nm, and an absorbance of a wavelength of 750 nm, respectively, when an absorbance of a wavelength of 350 nm is set to 1), the C/Ti element ratio on the surface of the particle by XPS, and the volume average particle diameter (in Table, marked as "D50v") are measured in accordance with the above-described methods.

The surface of the particle obtained in each of the examples is irradiated with an ultraviolet ray having a wavelength of 352 nm and at an irradiation intensity of 1.3 mW/cm$^2$ at 25° C. for 20 hours. Then, the C/Ti element ratio on the surface of the particle by XPS is measured in accordance with the above-described method and the reduced amount of the C/Ti element ratio before and after the irradiation with the ultraviolet ray is calculated.

Evaluation

Decomposing Ability (Photocatalyst Activation)

Decomposing ability is evaluated as photocatalyst characteristics in the visible light region. Regarding evaluation of the decomposing ability, evaluation is performed by using decomposing ability (chromaticity variation) of methylene blue. Specifically, the particles obtained in each of the examples are dispersed in pure water containing 4 parts by weight of methanol, so as to cause solid concentration to be 2 parts by weight. Then, the dispersion is ejected and applied onto filter paper (5 cm square: No. 5A manufactured by Advantech Co., Ltd.). Then, the paper is dried, and thus sample particles are uniformly adhered to the surface of the filter paper.

Then, a methylene blue diluted liquid obtained in a manner that a 2 wt % methylene blue aqueous solution is diluted and prepared 5 times in methanol is ejected and applied onto the surface thereof. Then, drying is performed, and thus a sample piece is prepared.

A test piece just after the test piece is prepared is continuously irradiated with visible light (10,000 LX (LUX)) for two hours by using a light emitting diode (LED) which performs irradiation with visible light having a wavelength of 400 nm to 550 nm. The light emitting diode does not have an absorption wavelength region (wavelength of 400 nm to 800 nm) of methylene blue. At this time, a 5-yen coin is disposed at the center portion of the irradiated surface of the test piece, and thus a blocked portion of the irradiation is formed.

Just after the test piece is prepared, hue of the test piece after irradiation with visible light for two hours is measured by a spectral color difference meter "RM200QC (manufactured by X-Rite Inc.)", and ΔE1 and ΔE2 calculated by the following expression are obtained.

Chromaticity E is a value calculated by an expression of $E=\{(a^*)^2+(b^*)^2+(C^*)^2\}^{0.5}$. Each of a*, b*, and C* represents a value based on an a*b*C* color system.

ΔE1=(chromaticity of the irradiated surface after continuous irradiation with visible light for two hours)−(chromaticity of the surface of a test piece just after the test piece is prepared)  Expression:

ΔE2=(chromaticity of the blocked surface of the irradiation after continuous irradiation with visible light for two hours)−(chromaticity of the surface of the test piece just after the test piece is prepared)  Expression:

Thus, decomposing ability is evaluated based on a decoloring variation value ΔE=ΔE1−ΔE2. Evaluation criteria are as follows.

—Evaluation Criteria of Decomposing Ability—
A: 15%≤ΔE
B: 5%≤ΔE<15%
C: ΔE<5%

(Dispersibility (Particle Aggregation))

The dispersibility is evaluated as follows. 0.05 g of particles obtained in each of the examples is put into a beaker, and 40 g of methyl ethyl ketone is added thereto. Then, particle diameter distribution after dispersing is performed for 10 minutes in an ultrasonic dispersion machine is measured by NANOTRACK UPA-ST (a dynamic light scattering type particle diameter measuring device manufactured by Microtrac Bel). Thus, evaluation is performed by distribution form of volume particle diameter distribution. Evaluation criteria are as follows.

—Evaluation Criteria of Dispersibility—
A: one peak value in the volume particle diameter distribution is provided, and dispersibility is good
B: two peak values in the volume particle diameter distribution are provided, but the main peak value is equal to or more than 10 times the other peak value. Thus, actually, there is no problem in dispersibility.
C: three peak values or more in the volume particle diameter distribution are provided, and dispersibility is poor.

Dispersibility (Dispersion into Binder)

The dispersibility is evaluated as follows. 0.05 g of particles obtained in each of the examples is put into a beaker, 1 g of a methyl ethyl ketone solution obtained by dissolving acrylic resin (Mw=10,000) at concentration of 1.8 wt % is added, and the particles are sufficiently blended. Then, 40 g of methyl ethyl ketone are added and particle diameter distribution after dispersing is performed for 10 minutes in an ultrasonic dispersion machine is measured by NANOTRACK UPA-ST (a dynamic light scattering type particle diameter measuring device manufactured by Microtrac Bel). Thus, evaluation is performed by using a distribution form of volume particle diameter distribution. Evaluation criteria are as follows.

Evaluation Criteria of Dispersibility
A: one peak value in the volume particle diameter distribution is provided, and dispersibility is good
B: two peak values in the volume particle diameter distribution are provided, but the main peak value is equal to or more than 10 times the other peak value. Thus, actually, there is no problem in dispersibility.
C: three peak values or more in the volume particle diameter distribution are provided, and dispersibility is poor.

Decomposition Prevention Property of Binder

A decomposition prevention property of the binder is evaluated as follows. 0.5 g of particles obtained in each of the examples is put into a beaker, and 2 g of a methyl ethyl ketone solution obtained by dissolving acrylic resin (Mw=10,000) at concentration of 13 wt % are added. After stirring, 1 mL is portioned by a glass pipette and this is widely applied to a glass plate (50 mm×50 mm). Then, drying is sufficiently performed, and thus a test piece is prepared. Two test pieces are prepared.

Then, one test piece is continuously irradiated with visible light (30,000 LX (LUX)) by using a light emitting diode (LED) which performs irradiation with visible light having a wavelength of 400 nm to 800 nm, for 30 hours. The other test piece is stored in a dark place.

Regarding a surface coating film of each of the test pieces which has been stored in the dark place and has been irradiated with visible light for 30 hours, infrared spectroscopic peak intensity of a carbonyl group (C=O) in an acrylic polymer (binder) is measured by an infrared spectrophotometer FTIR-410 (manufactured by JASCO Corporation). Then, ΔT calculated by the following expression is obtained.

ΔT=(infrared spectroscopic peak intensity of carbonyl group (C=O) in sample after irradiation with visible light for 30 hours)/(infrared spectroscopic peak intensity of carbonyl group (C=O) in sample stored in dark place)    Expression:

The decomposition prevention property of the binder is evaluated by using the value of ΔT which is an infrared peak intensity ratio of the carbonyl group (C=O). Evaluation criteria are as follows.

Evaluation Criteria of Decomposition Prevention Property of Binder

A: 0.8≤ΔT

B: 0.6≤ΔT<0.8

C: ΔT<0.6

Tables 1 and 2 show a list of the details and evaluation results of each of the examples.

TABLE 1

| | | Metal-containing compound | | | | Before irradiation with ultraviolet ray UV-Vis characteristics | | |
|---|---|---|---|---|---|---|---|---|
| | Material of particle | Type | M | Added amount (wt %) | Heating temperature (° C.) | Absorbance of wavelength of 450 nm | Absorbance of wavelength of 600 nm | Absorbance of wavelength of 750 nm |
| Example 1 | Anatase type titanium oxide | Isobutyl | Si | 40% | 400 | 0.42 | 0.33 | 0.21 |
| Example 2 | Anatase type titanium oxide | Hexyl | Si | 40% | 400 | 0.58 | 0.43 | 0.26 |
| Example 3 | Anatase type titanium oxide | Decyl | Si | 40% | 400 | 0.56 | 0.42 | 0.25 |
| Example 4 | Anatase type titanium oxide | Hexyl | Si | 50% | 400 | 0.60 | 0.45 | 0.29 |
| Example 5 | Anatase type titanium oxide | Hexyl | Si | 40% | 250 | 0.24 | 0.16 | 0.07 |
| Example 6 | Anatase type titanium oxide | Hexyl | Si | 40% | 500 | 0.35 | 0.23 | 0.13 |
| Example 7 | Anatase type titanium oxide | Hexyl | Si | 25% | 400 | 0.30 | 0.20 | 0.11 |
| Example 8 | Anatase type titanium oxide | Hexyl | Si | 75% | 400 | 0.59 | 0.43 | 0.25 |
| Example 9 | Rutile type titanium oxide | Hexyl | Si | 40% | 400 | 0.60 | 0.44 | 0.28 |
| Example 10 | Sol-gel titanium oxide | Hexyl | Si | 40% | 400 | 0.56 | 0.44 | 0.26 |
| Example 11 | Anatase type titanium oxide | Hexyl | Si | 10% | 400 | 0.12 | 0.09 | 0.02 |
| Example 12 | Anatase type titanium oxide | Methyl | Si | 40% | 400 | 0.31 | 0.21 | 0.13 |
| Example 13 | Anatase type titanium oxide | HMDS | Si | 40% | 400 | 0.33 | 0.24 | 0.14 |
| Example 14 | Anatase type titanium oxide | Dodecyl | Si | 30% | 400 | 0.55 | 0.40 | 0.23 |
| Example 15 | Anatase type titanium oxide | Phenyl | Si | 40% | 400 | 0.25 | 0.18 | 0.11 |
| Example 16 | Anatase type titanium oxide | Hexyl | Si | 40% | 180 | 0.18 | 0.12 | 0.08 |
| Example 17 | Sol-gel titanium oxide | Hexyl | Si | 40% | 400 | 0.55 | 0.38 | 0.24 |
| Example 18 | Sol-gel titanium oxide | Hexyl | Si | 40% | 400 | 0.50 | 0.38 | 0.21 |
| Example 19 | Anatase type titanium oxide | Isobutyl | Si | 40% | 400 | 0.40 | 0.31 | 0.20 |
| Example 20 | Anatase type titanium oxide | Isopropyl-triisostearoyl | Ti | 40% | 400 | 0.25 | 0.16 | 0.08 |
| Example 21 | Anatase type titanium oxide | diiso-propylate | Al | 40% | 400 | 0.31 | 0.21 | 0.12 |

| | Before irradiation with ultraviolet ray | | After irradiation with ultraviolet ray | | Evaluation | | | |
|---|---|---|---|---|---|---|---|---|
| | XPS C/Ti element ratio | D50v (μm) | XPS C/Ti element ratio | Changed amount of C/Ti element ratio | Decomposing ability | Dispersibility (Particle aggregation) | (Binder) | Binder decomposition prevention property |
| Example 1 | 0.95 | 12 | 0.16 | 0.66 | A | A | A | A |
| Example 2 | 0.86 | 12 | 0.16 | 0.52 | A | A | A | A |
| Example 3 | 1.05 | 12 | 0.16 | 0.62 | A | A | A | A |
| Example 4 | 0.86 | 12 | 0.16 | 0.54 | A | A | A | A |
| Example 5 | 1.16 | 12 | 0.16 | 0.26 | A | A | A | A |
| Example 6 | 0.48 | 12 | 0.16 | 0.19 | B | A | B | A |
| Example 7 | 0.58 | 12 | 0.16 | 0.22 | A | A | B | A |
| Example 8 | 1.11 | 12 | 0.16 | 0.36 | A | A | A | A |
| Example 9 | 0.95 | 16 | 0.16 | 0.40 | A | A | A | A |
| Example 10 | 0.95 | 80 | 0.16 | 0.70 | A | A | A | A |
| Example 11 | 0.35 | 12 | 0.16 | 0.12 | B | A | B | A |
| Example 12 | 0.86 | 12 | 0.16 | 0.22 | B | A | B | A |
| Example 13 | 0.90 | 12 | 0.16 | 0.14 | B | A | B | A |
| Example 14 | 0.79 | 12 | 0.16 | 0.16 | B | A | A | A |
| Example 15 | 1.16 | 12 | 0.16 | 0.21 | B | B | B | A |
| Example 16 | 1.18 | 12 | 0.16 | 0.21 | B | A | A | A |
| Example 17 | 0.86 | 200 | 0.16 | 0.45 | A | A | A | A |
| Example 18 | 0.74 | 800 | 0.16 | 0.36 | A | A | A | A |

TABLE 1-continued

| | | | | | | | | |
|---|---|---|---|---|---|---|---|---|
| Example 19 | 0.95 | 80 | 0.16 | 0.79 | A | A | A | B |
| Example 20 | 0.88 | 12 | 0.60 | 0.28 | B | B | B | A |
| Example 21 | 0.76 | 12 | 0.40 | 0.36 | B | B | B | A |

TABLE 2

| | Material of particle | Metal-containing compound | | | | Before irradiation with ultraviolet ray UV-Vis characteristics | | | Before irradiation with ultraviolet ray | | After irradiation with ultraviolet ray | | Evaluation | | | |
|---|---|---|---|---|---|---|---|---|---|---|---|---|---|---|---|---|
| | | Type | M | Added amount (wt %) | Heating temperature (° C.) | Absorbance of wavelength of 450 nm | Absorbance of wavelength of 600 nm | Absorbance of wavelength of 750 nm | XPS C/Ti element ratio | D50v (μm) | XPS C/Ti element ratio | Changed amount of C/Ti element ratio | Decomposing ability | Dispersibility (Particle aggregation) | (Binder) | Binder decomposition prevention property |
| Comparative Example 1 | Anatase type titanium oxide | None | — | None | None | 0 | 0 | 0 | 0.19 | 12 | 0.16 | 0.03 | C | C | C | A |
| Comparative Example 2 | Rutile type titanium oxide | None | — | None | None | 0 | 0 | 0 | 0.19 | 16 | 0.16 | 0.03 | C | C | C | A |
| Comparative Example 3 | Anatase type titanium oxide | None | — | None | 400 | 0 | 0 | 0 | 0.16 | 12 | 0.16 | 0 | C | C | C | A |
| Comparative Example 4 | Rutile type titanium oxide | None | — | None | 400 | 0 | 0 | 0 | 0.16 | 16 | 0.16 | 0 | C | C | C | A |
| Comparative Example 5 | Anatase type titanium oxide | Isobutyl | Si | 5% | 400 | 0.02 | 0.01 | 0.01 | 0.19 | 12 | 0.16 | 0.03 | C | C | C | A |
| Comparative Example 6 | Anatase type titanium oxide | Isobutyl | Si | 120% | 400 | 0.60 | 0.43 | 0.26 | 1.53 | 12 | 1.47 | 0.06 | C | B | B | A |
| Comparative Example 7 | Anatase type titanium oxide | Isobutyl | Si | 40% | 600 | 0.06 | 0.03 | 0.01 | 0.25 | 12 | 0.21 | 0.04 | C | C | C | A |
| Comparative Example 8 | Anatase type titanium oxide | Isobutyl | Si | 40% | 160 | 0.01 | 0 | 0 | 1.32 | 12 | 1.26 | 0.05 | C | A | A | A |
| Comparative Example 9 | Anatase type titanium oxide | Isobutyl | Si | 40% | None | 0 | 0 | 0 | 1.50 | 12 | 1.44 | 0.06 | C | A | A | A |

It is understood that the examples have decomposing ability better than that in the comparative examples, from the above results. Thus, it is understood that the examples show a high photocatalyst function even in the visible light region in comparison to the comparative examples. It is understood that the examples also secure dispersibility and decomposition prevention property of the binder.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A titanium oxide particle, comprising:
   a core of titanium oxide; and
   a metal compound having a hydrocarbon group, which is bonded to a surface of the core through an oxygen atom, wherein the titanium oxide particle absorbs light having a wavelength of 450 nm and light having a wavelength of 750 nm, an element ratio C/Ti between carbon C and titanium Ti on a surface on the titanium oxide particles is from 0.3 to 1.2, and the element ratio of C/Ti on the surface of the titanium oxide particle after irradiation with an ultraviolet ray having a wavelength of 352 nm and at an irradiation intensity of 1.3 mW/cm$^2$ for 20 hours is reduced in an amount from 0.1 to 0.9.

2. The titanium oxide particle according to claim 1, which has an absorption in a whole range of a wavelength of 400 nm to 800 nm in a visible absorption spectrum.

3. The titanium oxide particle according to claim 1, which is prepared by subjecting a core of titanium oxide to a surface treatment with a metal-containing compound to obtain the titanium oxide particle, the metal-containing compound being a compound represented by $R^1{}_n SiR^2{}_m$ wherein $R^1$ represents an aliphatic hydrocarbon group or an aromatic hydrocarbon group which has 1 to 20 carbon atoms and is saturated or unsaturated, $R^2$ represents a halogen atom or an alkoxy group, n represents an integer of 1 to 3, m represents an integer of 1 to 3, provided that n+m=4 is satisfied, when n represents an integer of 2 or 3, plural $R^1$'s may be the same or different, and when m represents an integer of 2 or 3, plural $R^2$'s may be the same or different.

4. The titanium oxide particle according to claim 3, wherein $R^1$ is a straight chain shape saturated aliphatic hydrocarbon group.

5. The titanium oxide particle according to claim 3, wherein $R^1$ is a hexyl group.

6. The titanium oxide particle according to claim 3, wherein $R^1$ is an aromatic hydrocarbon group having 6 to 18 carbon atoms.

7. The titanium oxide particle according to claim 6, wherein $R^1$ is a phenyl group.

8. The titanium oxide particle according to claim 3, wherein $R^2$ is an alkoxy group having 1 to 10 carbon atoms.

9. The titanium oxide particle according to claim 3, wherein $R^2$ is a methoxy group.

10. The titanium oxide particle according to claim 3, wherein $R^2$ is a chlorine atom.

11. The titanium oxide particle according to claim 1, which has a volume average particle diameter of from 10 nm to 1 μm.

12. A composition for forming a photocatalyst, comprising:
the titanium oxide particle according to claim 1; and
at least one compound selected from the group consisting of a dispersion medium and a binder.

13. The composition for forming a photocatalyst according to claim 12,
wherein the dispersion medium contains water or an organic solvent.

14. The composition for forming a photocatalyst according to claim 13,
wherein the organic solvent is an alcohol solvent.

15. The composition for forming a photocatalyst according to claim 12,
wherein the binder comprises at least one selected from the group consisting of a fluorine resin, a silicone resin, a polyester resin, and an acrylic resin.

16. The composition for forming a photocatalyst according to claim 12,
comprising a coloring material included in the binder.

17. A photocatalyst comprising the titanium oxide particle according to claim 1.

18. The photocatalyst according to claim 17, further comprising a promotor.

19. The photocatalyst according to claim 17, further comprising an antiseptic agent.

20. The photocatalyst according to claim 17, further comprising a thickener.

* * * * *